United States Patent [19]

Ogura et al.

[11] Patent Number: 5,225,033
[45] Date of Patent: Jul. 6, 1993

[54] PROCESS FOR PRODUCING MAGNETIC HEAD OF THE FLOATING TYPE

[75] Inventors: Takashi Ogura, Daito; Takashi Yanai, Habikino; Hiroyuki Okuda, Kadoma; Takao Yamano, Daito; Tsukasa Shimizu, Yao, all of Japan

[73] Assignee: Sanyo Electric Co., Ltd., Moriguchi, Japan

[21] Appl. No.: 793,967

[22] Filed: Nov. 18, 1991

[30] Foreign Application Priority Data

Nov. 19, 1990 [JP] Japan .................. 2-313473
Dec. 14, 1990 [JP] Japan .................. 2-402352

[51] Int. Cl.$^5$ ............... B44C 1/22; C23F 1/00
[52] U.S. Cl. ............... 156/633; 156/634; 156/643; 156/656; 156/659.1; 156/667
[58] Field of Search .......... 156/629, 633, 634, 643, 156/650, 652, 655, 659.1, 667; 29/603, 604, 602.1; 204/192.32; 360/110, 119, 121, 122, 125; 427/127, 128, 131

[56] References Cited

U.S. PATENT DOCUMENTS 4,875,970 10/1989 Takeya et al. ............ 156/667 X
4,948,460 8/1990 Sandaiji et al. ............ 156/633 X
5,104,483 4/1992 Takeya .................. 156/667 X Primary Examiner—William A. Powell
Attorney, Agent, or Firm—Armstrong, Westerman, Hattori, McLeland & Naughton

[57] ABSTRACT

A process for producing a magnetic head of the floating type having a head portion and a slider portion comprises preparing a core block 7 having arranged on a plane a head forming portion and a slider forming portion for providing the head portion and the slider portion, respectively, and forming at least one pair of track width defining grooves 14, 14 across a gap spacer 4 by dry-etching a surface 8 of the core block 7 which is to be opposed to media to form a magnetic gap portion G by a portion of the gap spacer of a predetermined track width between the pair of grooves.

6 Claims, 17 Drawing Sheets

PROCESS FOR PRODUCING MAGNETIC HEAD OF THE FLOATING TYPE

FIELD OF THE INVENTION

The present invention relates to a process for producing magnetic heads, and more particularly to a process for producing a magnetic head of the floating type wherein grooves for defining the track width is formed by etching with high precision.

BACKGROUND OF THE INVENTION

Floating-type magnetic heads for use in hard disc recording-reproduction apparatus must be of smaller size and need to fulfill the requirement that the amount of levitation and the track width be made minuter with higher precision in view of the trend of magnetic recording toward higher density in recent years.

FIG. 6 shows a conventional floating magnetic head of the MIG (Metal-In-Gap) type having a head portion H wherein thin films 19, 19 of ferromagnetic metal, such as Sendust, are formed on opposite sides of a magnetic gap portion G, and a slider portion S made of the same material as the main core of the head portion H integrally therewith. Thus, the magnetic head is formed monolithically.

The magnetic head shown in FIG. 6 is produced by the process illustrated in FIGS. 7 to 12.

With reference to FIGS. 7 and 8, two mirror-finished magnetic substrates 1a, 1b are made, for example, of ferrite and are different in thickness. These substrates have surfaces (to be joined together) which are each formed with track width defining grooves 2, winding grooves 3 and a thin film 19 of Sendust or like ferromagnetic metal.

As shown in FIG. 9, a gap spacer 4 of SiO2 or like nonmagnetic material is formed over the joint surface of at least one of the substrates, i.e., the substrate 1a. The two substrates 1a, 1b are thereafter fixedly joined to each other to prepare a block 6 by arranging the substrates 1a, 1b face-to-face with their gap forming faces in butting contact with each other, inserting glass rods (not shown) into the winding grooves 3, melting the rods and solidifying the melt to fill the track width defining grooves 2 with glass 5.

The block 6 is then cut into two core blocks 7, 7 as seen in FIG. 10. Further as shown in FIG. 11, a side surface 12 of the core block 7 is grooved except at magnetic gap portions G provided by the gap spacer 4 and the vicinity thereof, and the core block 7 is thereafter ground over the surface 8 thereof to be opposed to media to obtain a predetermined depthwise length d and finish the surface 8 to a mirror surface.

Next as shown in FIG. 12, rail grooves 9 are formed in the surface 8, and the core block is cut into a plurality of core chips 10, 10. In this way, the magnetic head 1 shown in FIG. 9 is completed.

However, the process for producing the above magnetic head 1 has a problem. When to be joined together, the substrates 1a, 1b become inevitably displaced from each other, with the result that it is impossible to give an accurate track width to the magnetic gap portion G.

Recently, therefore, a process is employed wherein grooves for defining the track width are formed in a core block which is prepared by joining two substrates together with a gap spacer provided therebetween and cutting the resulting block. FIG. 13 shows a magnetic head 13 prepared by this production process, and FIGS. 14 to 21 show the process.

FIGS. 14 and 15 show two mirror-finished substrates 1a, 1b made of a magnetic material such as ferrite and different in thickness. The surfaces of these substrates to be joined together are first each formed with winding grooves 3 and a thin film 19 of ferromagnetic metal.

Next as shown in FIG. 16, a gap spacer 4 of SiO2 or like nonmagnetic material is formed over the joint surface of at least one of the substrates, i.e., of the substrate 1a. The two substrates 1a, 1b are thereafter fixedly joined to each other to prepare a block 6 by arranging the substrates 1a, 1b face-to-face with their gap forming faces in butting contact with each other, inserting glass rods (not shown) into the winding grooves 3, melting the rods and solidifying the molten glass. The block 6 is cut into two core blocks 7, 7 as seen in FIG. 17.

Next as shown in FIG. 18, track width defining grooves 2 are formed in the upper surface of the core block 7, and molten glass 11 is thereafter applied to the upper surface of the core block to cover the grooves 2 as shown in FIG. 19, followed by solidification, whereby the grooves 2 are filled with the glass 11. Subsequently, the glass portion 11 applied over a side surface 12 of the core block 7 is removed by grinding, and the core block side surface 12 is grooved except at magnetic gap portions G and the vicinity thereof as seen in FIG. 20. The core block 7 is then ground over the surface thereof to be opposed to media to obtain a predetermined depthwise length d and finish the surface 8 to a mirror surface.

Next as shown in FIG. 21, rail grooves 9 are formed in the surface 8, and the core block 7 is cut into a plurality of core chips 10, 10. In this way, the magnetic head 13 shown in FIG. 13 is completed.

In the process for producing the magnetic head described, an abrasive wheel having diamond abrasive grains adhered thereto is used for forming the track width defining grooves 2. The abrasive wheel used for machining gives a considerably large width to the track width defining grooves 2, consequently making the magnetic head lower in mechanical strength and unstable in quality and also adversely affecting the amount of levitation. Accordingly, the grooves 2 are filled with the glass 11.

The process for producing the magnetic head 13 of FIG. 13 is free of the problem that the displacement involved in joining the substrates 1a, 1b together impairs the accuracy of the track width of the magnetic gap portion G. However, the abrasive wheel used for forming the track width defining grooves 2 inevitably form slopes 2a, 2a on the grooved side walls as shown in FIG. 22, so that the track width alters from a width Tw2 immediately after the formation of the grooves 2 to a width Tw1 corresponding to the amount d1 of grinding of the surface to be opposed to media. The variation in the track width is indefinite, consequently entailing the problem of impairing the accuracy of the track width. Furthermore, a layer degraded by machining remains in the magnetic head to result in impaired performance. The impairment of performance becomes more pronounced with a decrease in the track width.

SUMMARY OF THE INVENTION

An object of the present invention is to provide a process for producing magnetic heads of the floating type which is capable of defining an accurate track width with high precision and precluding the impairment of performance due to formation of a layer degraded by machining.

Another object of the invention is to provide a process for producing magnetic heads of the floating type wherein the track width defining grooves can be formed by etching.

Another object of the invention is to provide a process for producing a magnetic head of the floating type characterized by the steps of:

preparing a core block having arranged on a plane a head forming portion and a slider forming portion for providing a head portion and a slider portion respectively, the head forming portion comprising a pair of magnetic members opposed to each other with a gap spacer interposed therebetween, and forming at least one pair of track width defining grooves across the gap spacer by dry-etching a surface of the core block which is to be opposed to media and where the gap spacer terminates to form a magnetic gap portion by a portion of the gap spacer of a predetermined track width between the pair of track width defining grooves.

In the production process described above, the track width defining grooves are formed by etching, can therefore be formed with exceedingly higher precision than when the abrasive wheel is used as in the prior art and can be of minimized width and depth required. This obviates the need to fill the grooves with glass. As a result, the surface to be opposed to media can be ground to obtain the specified gap depth before forming the track width defining grooves. This eliminates the problem that the grinding impairs the accuracy of the track width of the magnetic gap portion. Furthermore, the layer degraded by machining will not be formed.

Another object of the invention is to provide a process for producing a magnetic head of the floating type wherein in the core block preparing step, a thin film of ferromagnetic metal is formed on at least one of the pair of magnetic members by an Fe-Al-Si-N alloy comprising 4.0 wt. % to 7.0 wt. % of aluminum Al, 8.0 wt. % to 12.0 wt. % of silicon Si, 0.5 wt. % to 5.0 wt. of nitrogen N and the balance substantially iron Fe, and the pair of magnetic members are fixedly joined to each other with glass as a bonding agent in a limited heat-treatment temperature of about 500° C. to about 600° C.

The Fe-Al-Si-N alloy used for forming the thin film of ferromagnetic metal in the above production process is an alloy prepared by incorporating a very small amount of nitrogen N into conventional Sendust alloy. The alloy is superior to Sendust alloy in magnetic characteristics such as saturation magnetic flux density, magnetic permeability and coercive force, whereas we have found that the alloy conversely becomes impaired in magnetic characteristics when heat-treated at a high temperature above 600° C.

Accordingly, even if the Fe-Al-Si-N alloy is used for the thin film 19 of ferromagnetic metal in the conventional production process shown in FIGS. 14 to 21, the glass for use in the glass bonding step of FIG. 16 needs to be one which is higher in melting temperature than the glass for use in the glass filling step of FIG. 19, with the result that the high-temperature heat-treatment step of FIG. 16 impairs the magnetic characteristics of the thin film 19 of Fe-Al-Si-N alloy, failing to provide a magnetic head of high performance.

In contrast, according to the magnetic head producing process of the invention wherein the track width defining grooves are formed by dry etching, the grooves can be of much smaller width than when they are formed by the abrasive wheel as conventionally practiced and therefore will not lower the mechanical strength of the magnetic head, nor will the grooves adversely influence the amount of levitation.

Consequently, there is no need to fill the track width defining grooves with glass, while a glass melting at a low temperature of 500° C. to 600° C. is usable in the glass bonding step shown in FIG. 16 without the likelihood of impairing the magnetic characteristics of the thin film 19 of ferromagnetic metal, i.e., of the Fe-Al-Si-N alloy to provide a magnetic head exhibiting high performance.

DETAILED DESCRIPTION OF EMBODIMENT

Figure 1A:
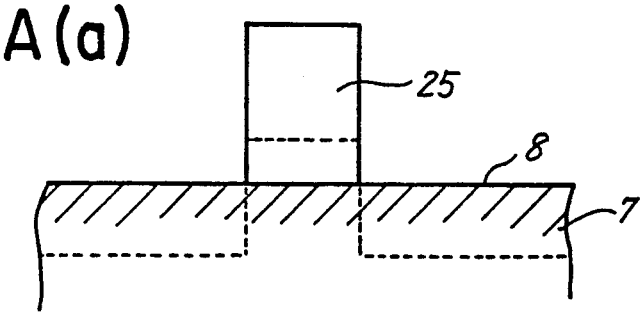
FIGS. 1A(i a)–1A(c), inclusive, are diagrams showing an etching step included in a magnetic head producing process embodying the invention.
Figure 1A:
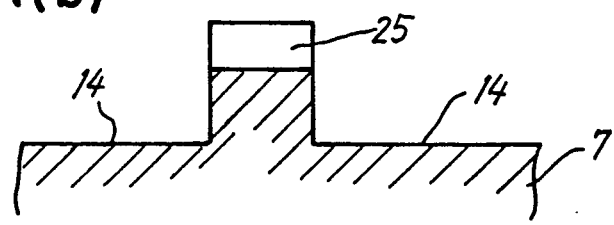
Figure 1A:
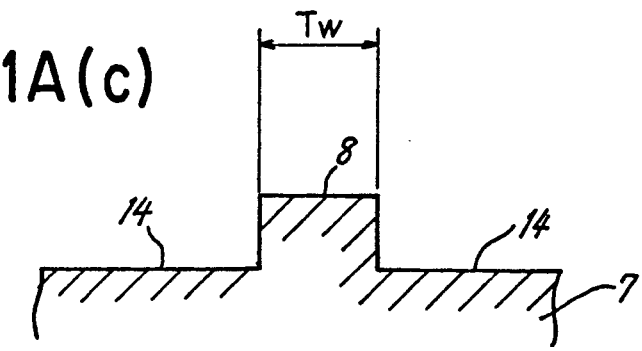

With reference to the drawings concerned, the present invention will be described below in greater detail, for example, as practiced for producing a monolithic magnetic head of the MIG type. Throughout the drawings showing the conventional examples and those illustrating the invention, like parts are designated by like reference numerals and will not be described repeatedly.

Figure 14:
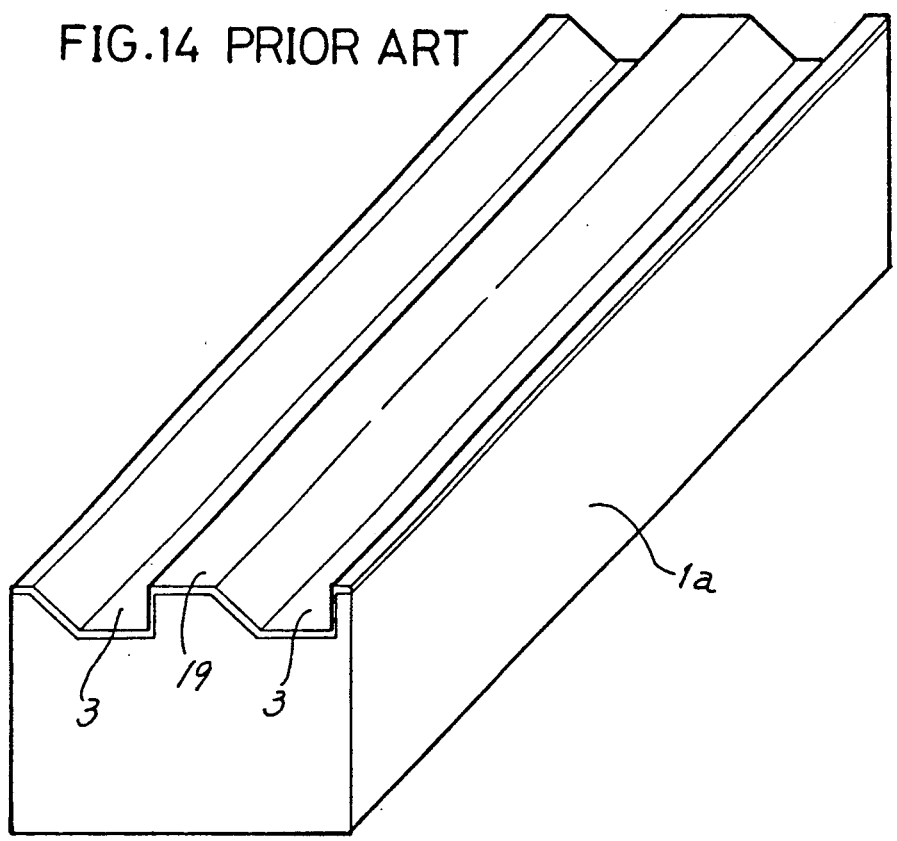
FIG. 14 to 21 are diagrams showing the conventional production process stepwise.
Figure 15:
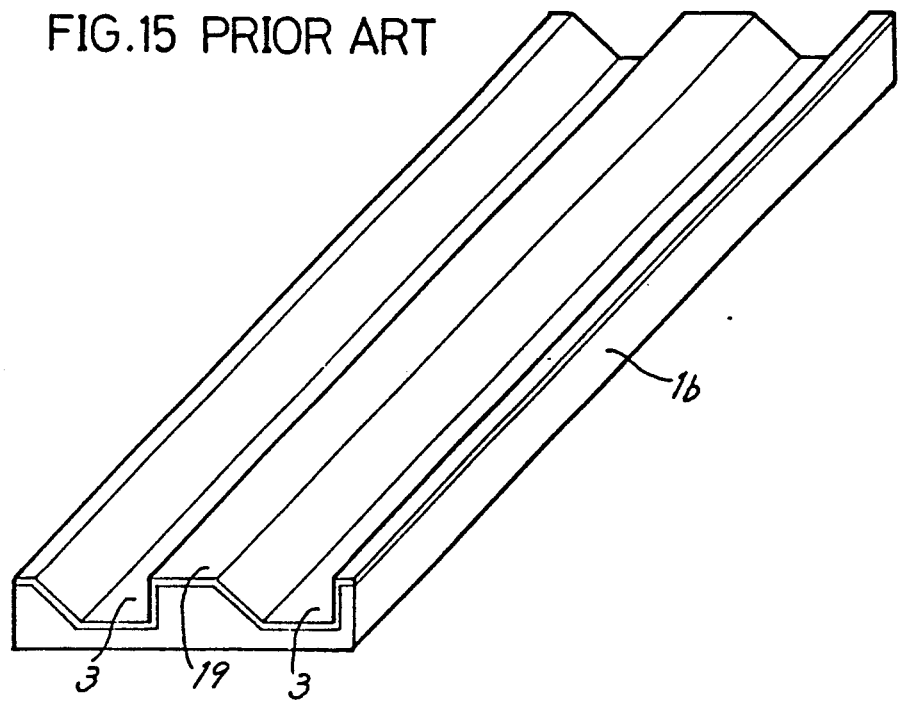
Figure 16:
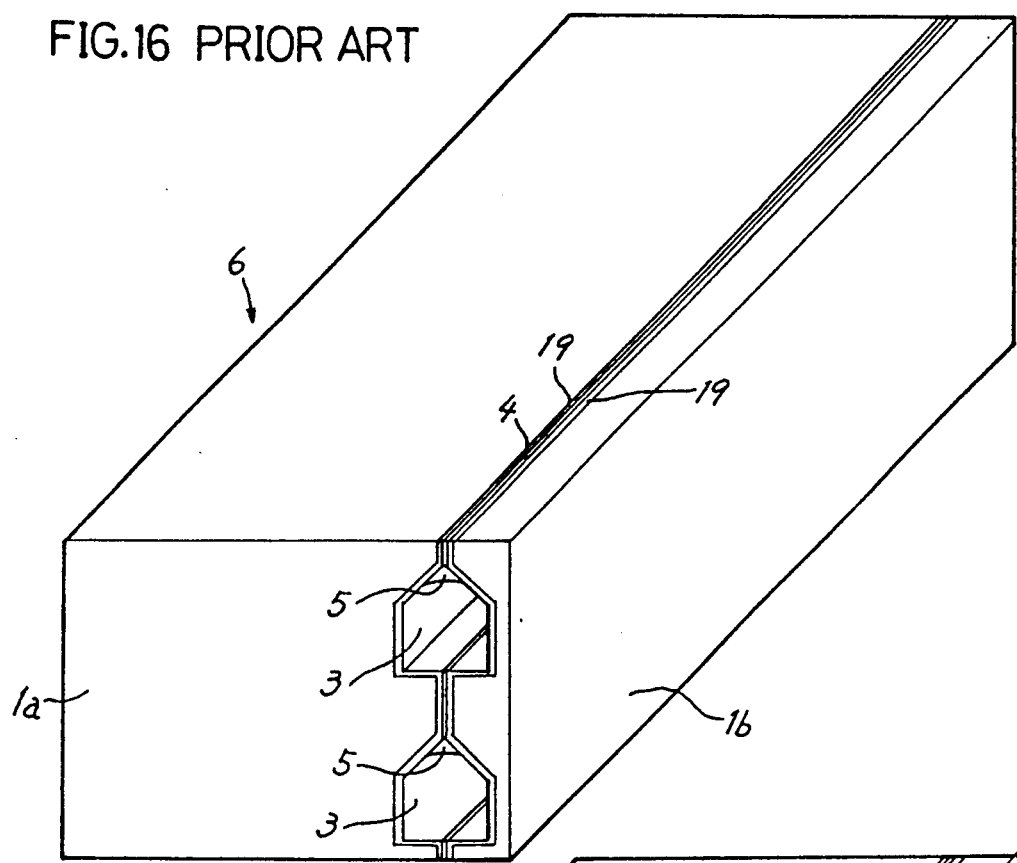
Figure 17:
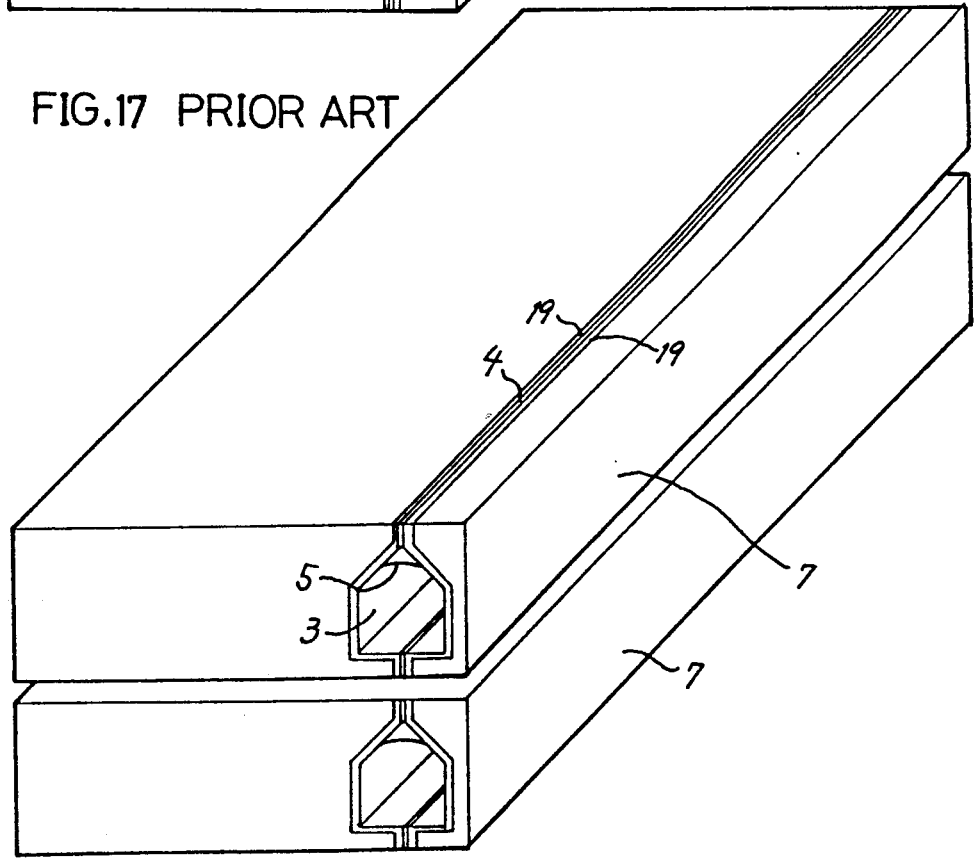
Figure 18:
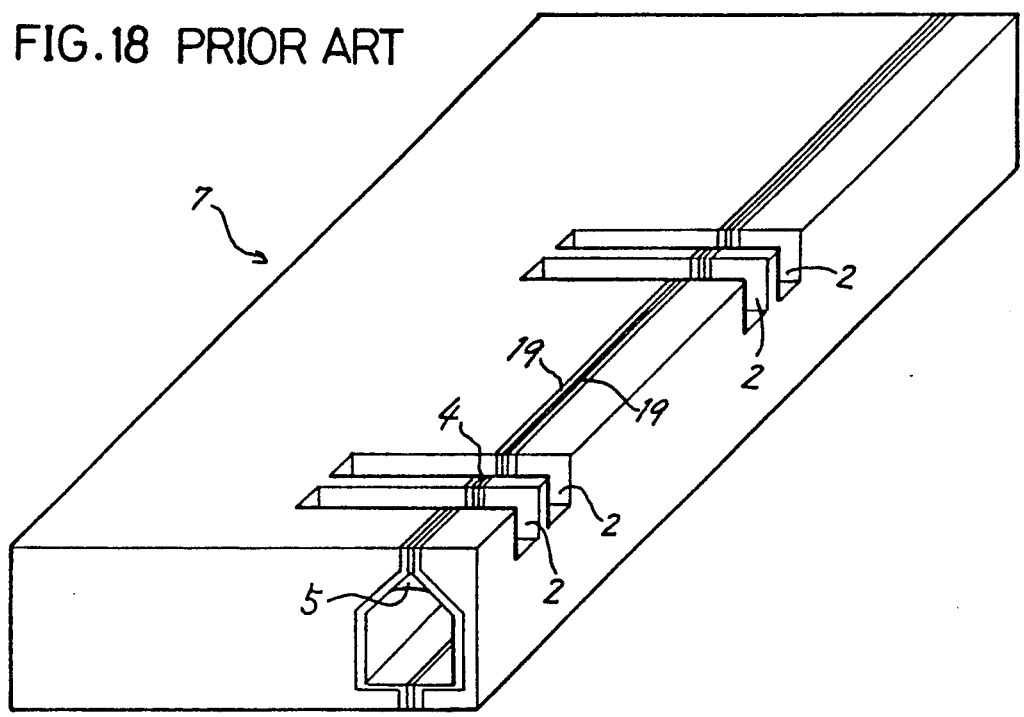
Figure 19:
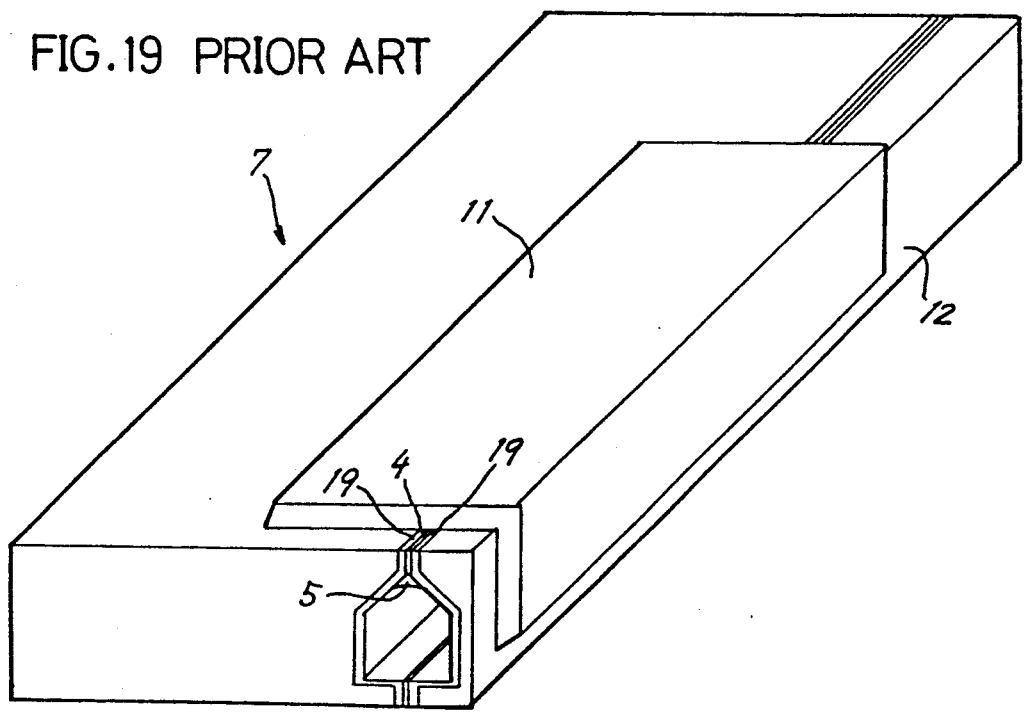
Figure 20:
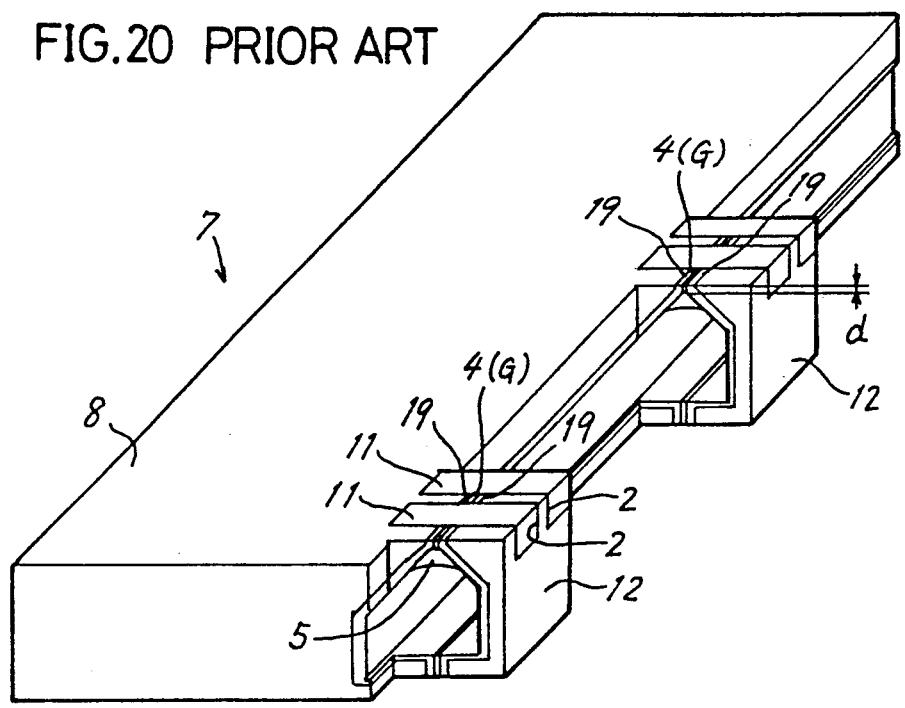
Figure 21:
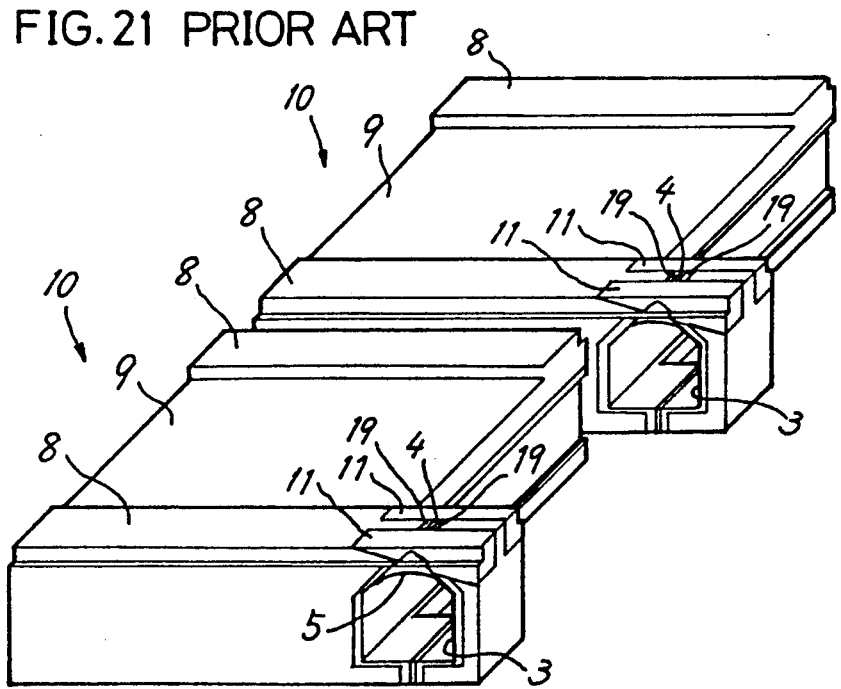
Figure 22:
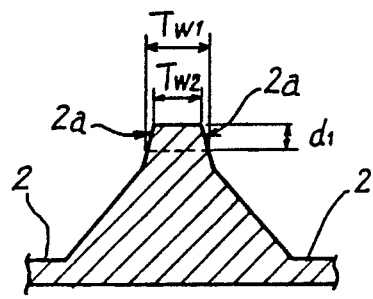
FIG. 22 is a sectional view of track width defining grooves for illustrating a problem involved in the process for producing the magnetic head shown in FIG. 13.

A core block 7 is prepared by generally the same steps as those shown in FIGS. 14 to 17. According to the invention, however, the thin film 19 of ferromagnetic metal shown in FIGS. 14 and 15 is prepared from an alloy of different composition from the conventional material as will be described later, and the melting temperature, i.e., the heat-treatment temperature, for the glass for use in the glass bonding step shown in FIG. 16 is set to the range of 500° C. to 600° C.

Figure 2:
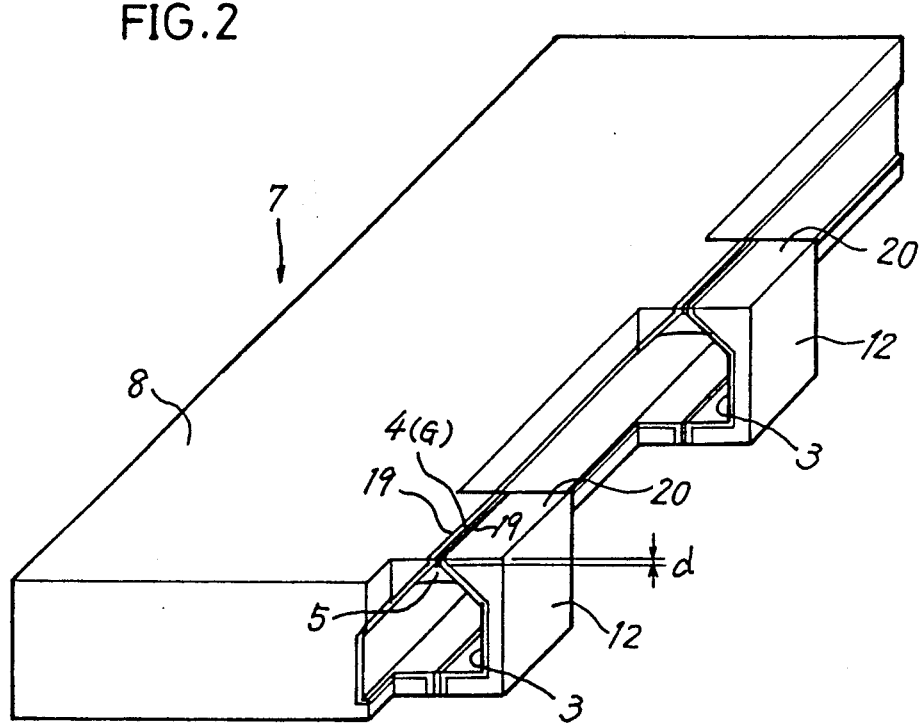
FIGS. 2 to 4 are diagrams showing a sequence of steps included in the magnetic head producing process of the invention.
Figure 3:
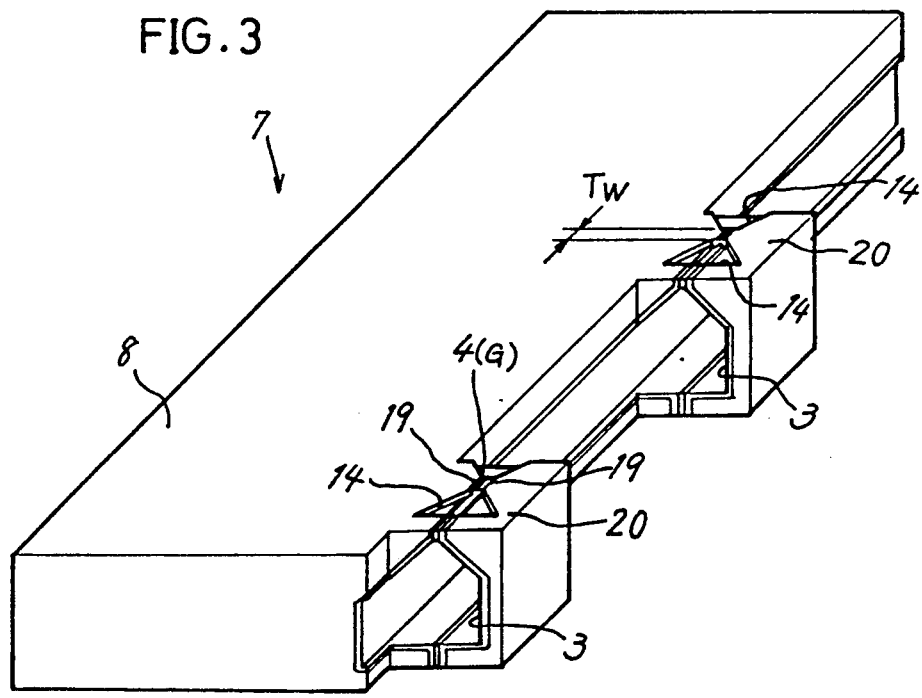

With reference to FIG. 2, a side surface 12 of the core block 7 prepared is grooved except at magnetic gap portions and the vicinity thereof to form head forming portions 20, 20. The surface 8 of the core block 7 to be opposed to media is then ground to obtain a predetermined depthwise length d and finish the surface 8 to a mirror surface. Next as shown in FIG. 3, track width defining grooves 14 are formed in the upper surfaces of the head forming portions 20, 20 of the core block 7 by the etching step to be described below to obtain a predetermined track width Tw.

Figure 4:
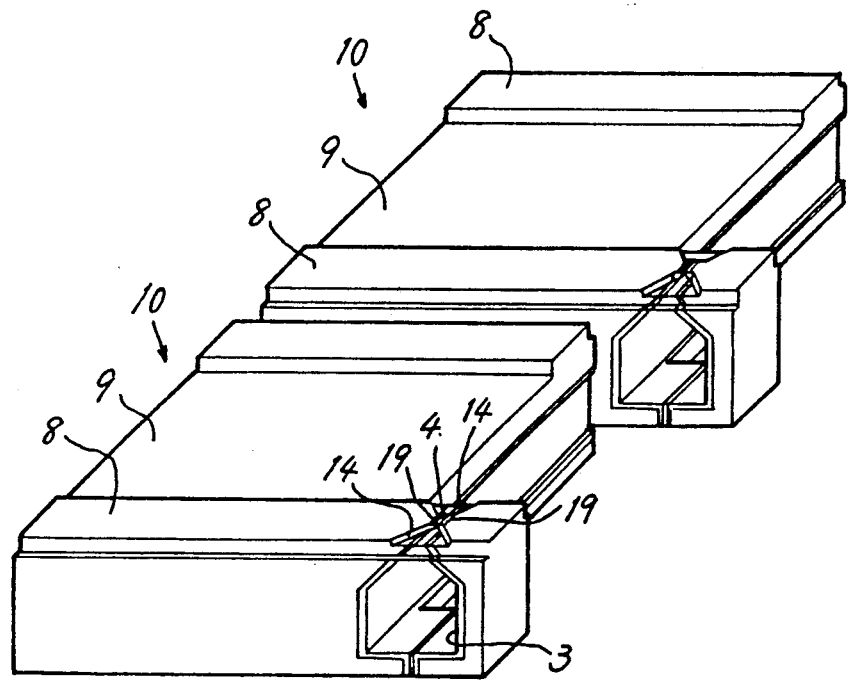
Figure 5:
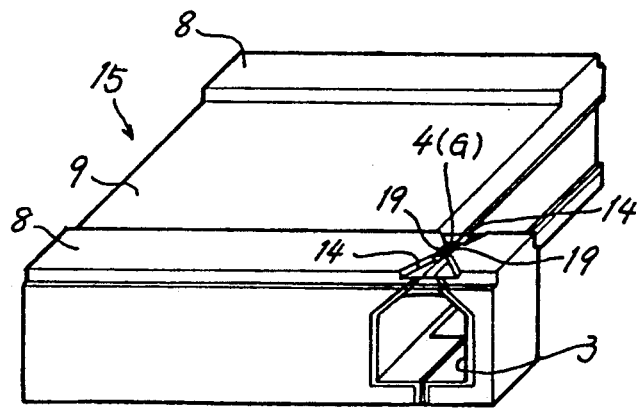
FIG. 5 is a perspective view showing the magnetic head obtained by the production process.
Figure 6:
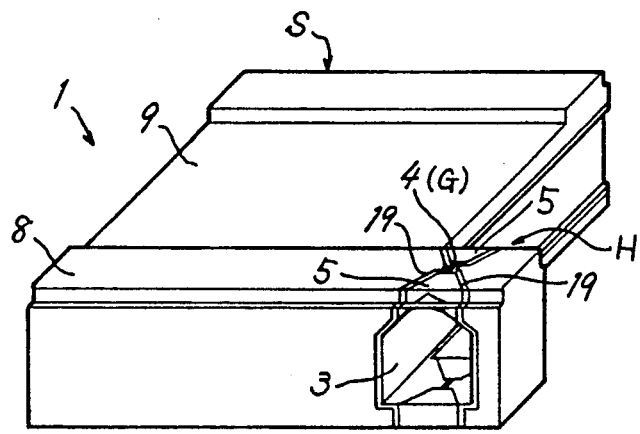
FIG. 6 is a perspective view showing a magnetic head obtained by a conventional production process.
Figure 7:
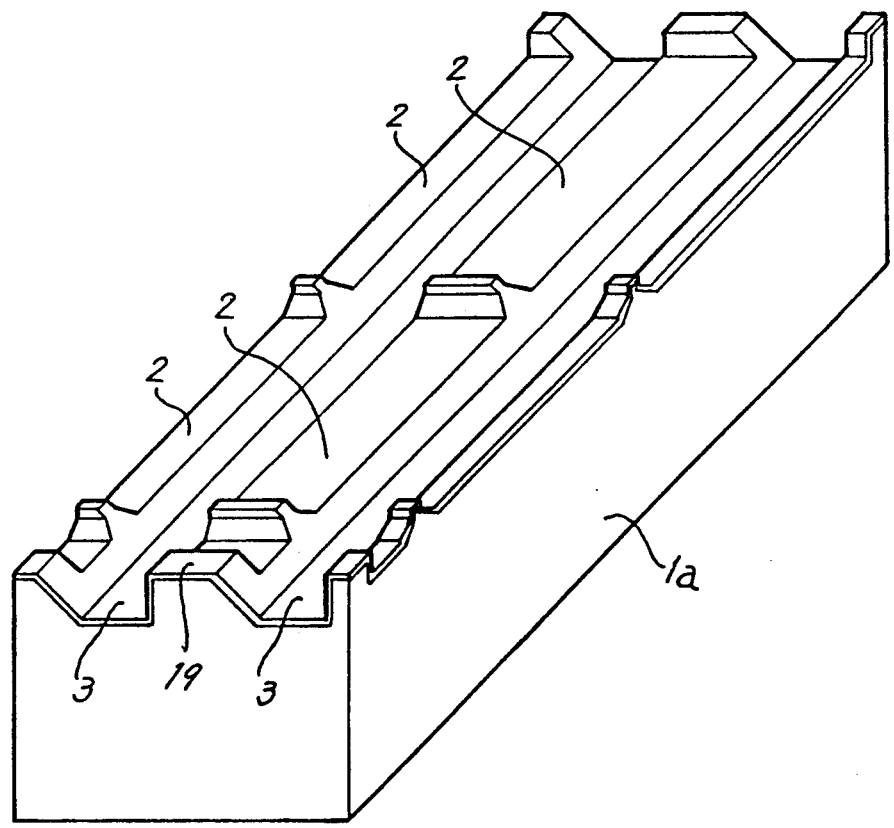
FIGS. 7 to 12 are diagrams showing the conventional production process stepwise.
Figure 8:
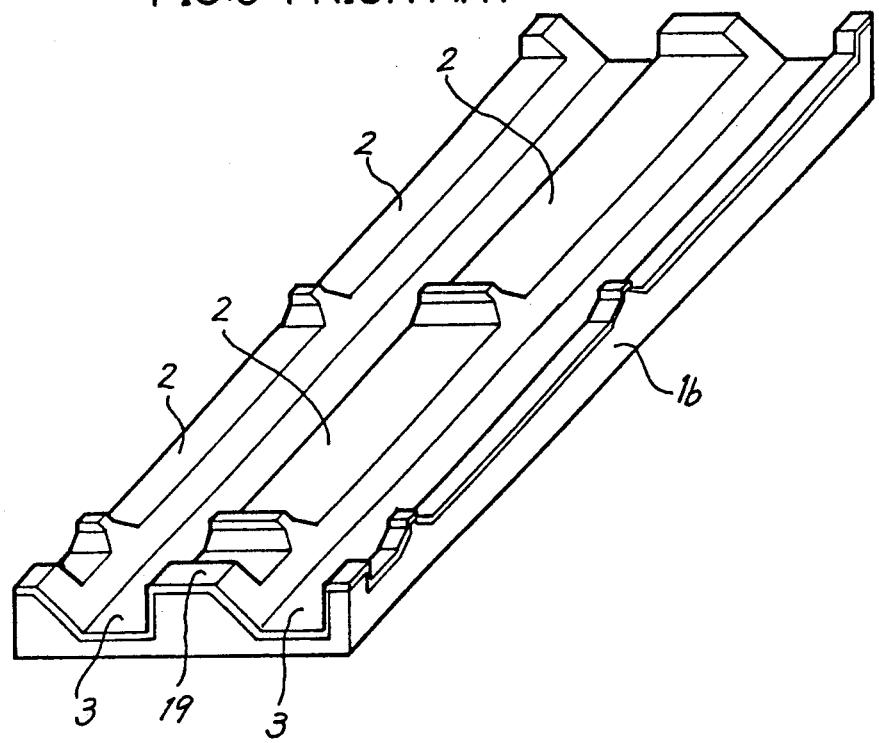
Figure 9:
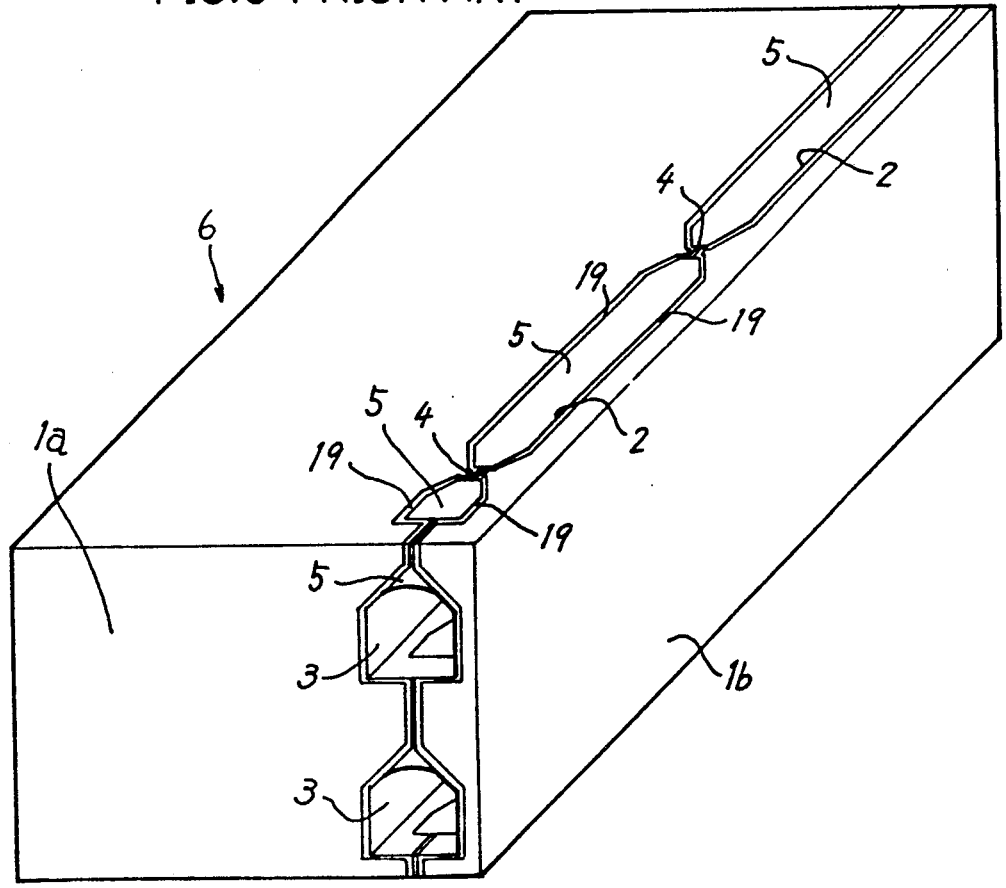
Figure 10:
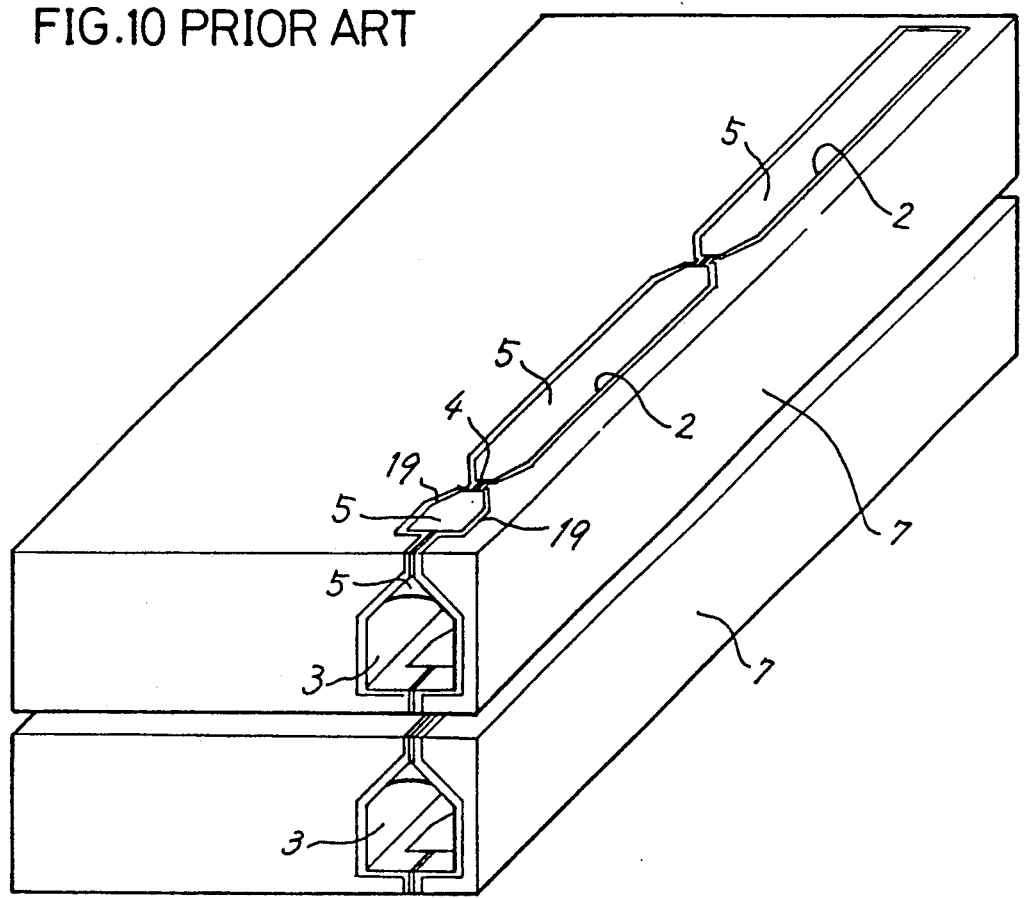
Figure 11:
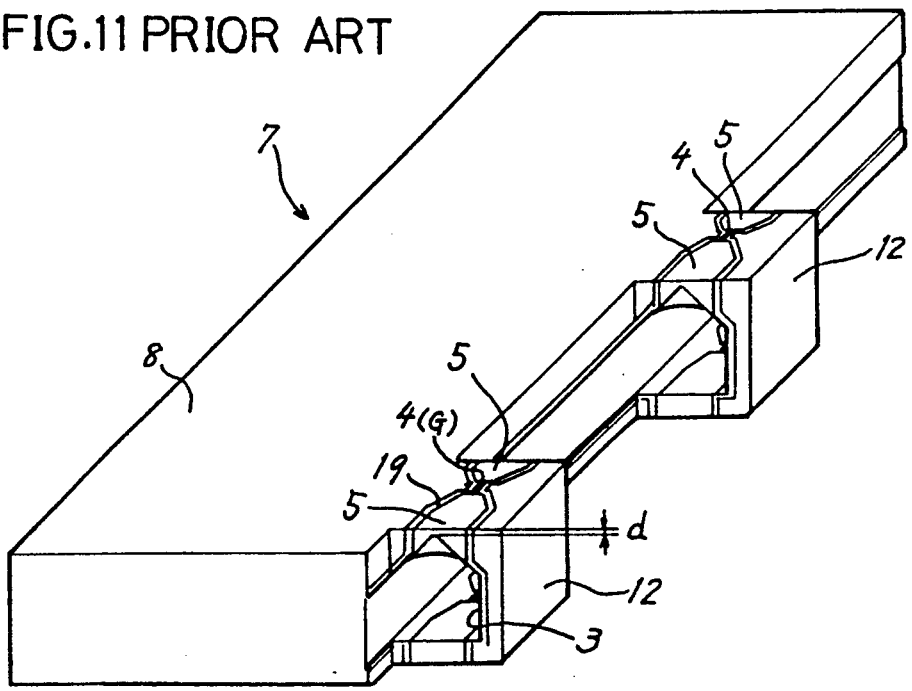
Figure 12:
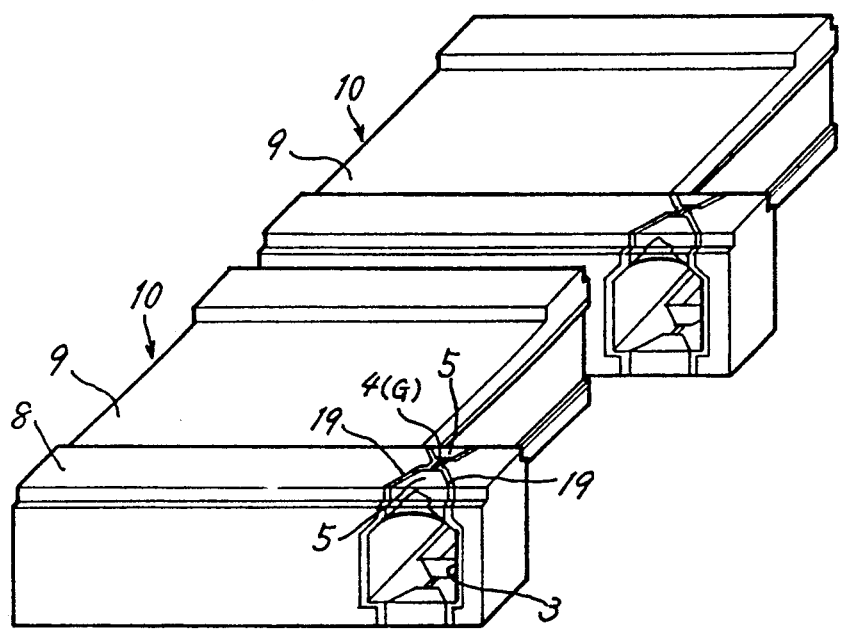
Figure 13:
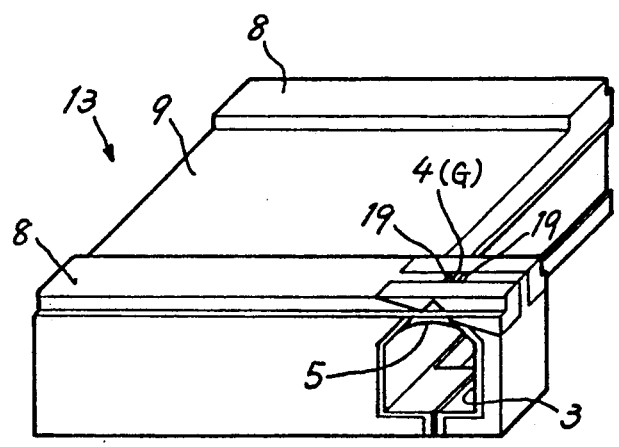
FIG. 13 is a perspective view of a magnetic head obtained by another conventional production process.

Next, rail grooves 9 are formed in the surface 8 as shown in FIG. 4. The core block 7 is thereafter cut into a plurality of core chips 10 to complete the floating-type magnetic head 15 shown in FIG. 5.

A description will be given of the method of forming the track width defining grooves 14 which is characteristic of the present invention with reference to FIGS. 1A, 1B and 1C.

The track width defining grooves 14 are formed basically by the dry etching step shown in FIG. 1A. Stated more specifically, a photoresist pattern 25 in conformity with the pattern of track width defining grooves is formed over the surface 8 of the core block 7 as seen in FIG. 1A, (a), and the block surface 8 is then subjected to reactive sputter etching or reactive ion beam etching with the photoresist pattern 25 serving as a mask to form the grooves 14 indicated in broken lines in FIG. 1A, (a) and shown in FIG. 1A, (b). Finally, the photoresist pattern 25 is removed as shown in FIG. 1A, (c). Consequently, a ridge is formed which has a width equal to the predetermined track width Tw.

Preferably, in this case, the depth of the track width defining grooves is greater than the predetermined depthwise length of the gap and is, for example, at least 5 micrometers. Accordingly, the photoresist pattern shown in FIG. 1A, (a) needs to be made accurately so as not to locally disappear during the progress of etching.

According to the present invention, therefore, we have developed an etching method which permits high-precision grooving with use of a mask having sufficient corrosion resistance to etching. This method, which is employed for forming the grooves 14, will be described with reference to FIGS. 1B and 1C. FIG. 1B, diagrams (a) to (e) are in section taken along the line I—I in FIG. 1C.

Figure 1B:
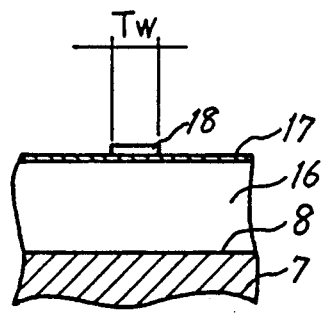
FIGS. 1B(a)–1B(e), inclusive, are diagrams showing another etching steps for use in the process.
Figure 1B:
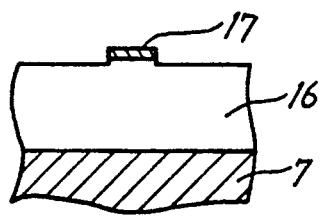
Figure 1B:
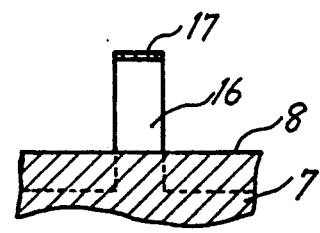
Figure 1B:
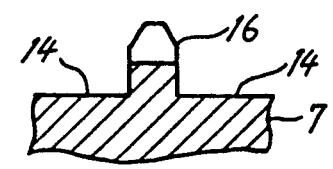
Figure 1B:
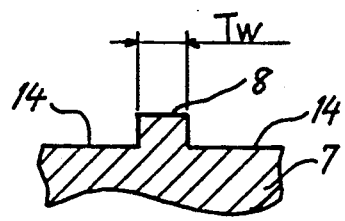
Figure 1C:
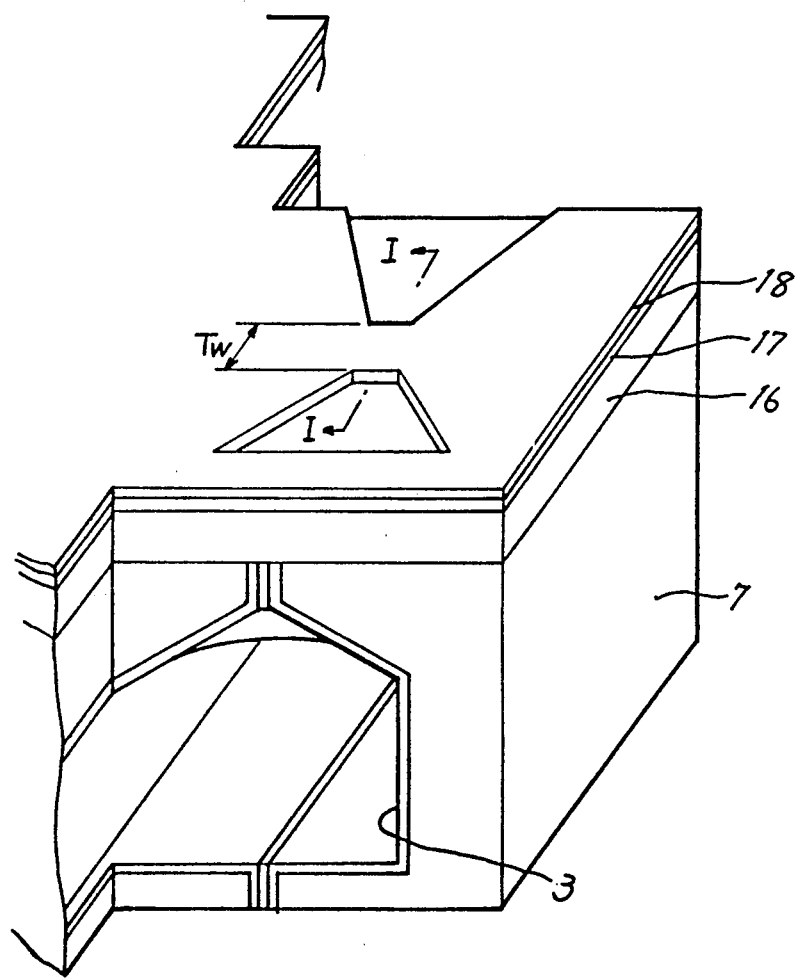
FIG. 1C is a perspective view showing a film of superposed layers as formed in the etching step of FIG. 1B.

As seen in FIG. 1B, (a) and FIG. 1C, a quinonediazide photoresist film (first film) 16 having a thickness of 20 micrometers is formed over the surface 8 of the core block 7 to be opposed to media. In forming the photoresist film 16, the film forming composition applied needs to be fully heat-treated (baked) and exposed to light for a photosensitive reaction so as not to undergo any reaction during the subsequent process. Furthermore, the applied composition must be baked at a limited temperature of up to 100° C. so that the film is removable after sputter etching.

Next, a copper film (second film) 17, 0.5 micrometer in thickness, is formed, for example, by vacuum evaporation. During the formation of the film 17, the temperature of the substrate needs to be limited to not higher than 100° C. so as to preclude degradation of the quinonediazide photoresist film 16 previously formed.

A quinonediazide photoresist film (third film) 18 is further formed to a thickness of 1 micrometer. As seen in FIGS. 1B, (a) and 1C, the resist film is patterned in conformity with the pattern of track width defining grooves by usual photoetching techniques. However, the film must be baked at a limited temperature of up to 100° C. so as to prevent the degradation of the first film (quinonediazide photoresist film) 16. In this way, a combined film of photoresist 16, copper film 17 and photoresist 18 in superposed layers is formed as shown in FIGS. 1B, (a) and 1C.

Next, the resulting film is irradiated with an argon ion beam under the following conditions to thereby remove the copper film 17 except the portions thereof covered with the photoresist film 18 as shown in FIG. 1B, (b). The conditions for the irradiation are acceleration voltage of 700 volts, irradiation angle of 20 deg, ion current of 0.8 mA/cm$^2$ and irradiation time of 15 minutes.

Next, the quinonediazide photoresist film 16 is removed except the portions thereof covered with the copper film 17 as shown in FIG. 1B, (c) by plasma etching under the conditions of: atmosphere oxygen 40 mtorr, applied power density 250 mW/cm$^2$, cathode drop voltage 0.7 kV and etching time 3 hours.

Next, the surface of the core block 7 is irradiated with an argon ion beam under the conditions given below to thereby etch the core block 7 except the portions thereof covered with the quinonediazide photoresist 16 as indicated in broken lines in FIG. 1B, (c) and shown in FIG. 1B, (d). The conditions for applying the argon ion beam are: acceleration voltage 700 volts, irradiation angle 20 deg, ion current 0.8 mA/cm$^2$ and irradiation time 5 hours.

Finally the core block 7 is washed with acetone to remove the remaining photoresist film 16. As a result, track width defining grooves 14, 14 are formed in the core block 7 as shown in FIG. 1B, (e), forming a ridge which has a width equal to the predetermined track width Tw.

In the etching step described above, the quinonediazide photoresist film 16 masking the core block 7 for etching is patterned by dry etching instead of the conventional exposure treatment. This makes it possible to form the film with a very large thickness and to pattern the film accurately. The use of the very thick resin film as a mask permits a long period of sputter etching without impairing the masking function, whereby the surface of the core block can be etched to a predetermined depth with the pattern maintained with high accuracy.

With the embodiment described above, the ferrite substrate of the core block can be etched to a depth of about 8 micrometers. This value is satisfactory since the floating-type magnetic head has a depthwise length of 5 micrometers. Further because the track width defining grooves 14 are formed by sputter etching, there is no likelihood of forming a layer which is degraded by machining. The magnetic head obtained therefore exhibits the desired performance free of impairment due to the degraded layer. Even when the magnetic head requires a larger depthwise length and deeper etching, the head can be produced by the process of the invention wherein the first resin film 16 is formed with an increased thickness.

According to the embodiment described, the track width defining grooves are not filled with any glass because these grooves, which are formed by sputter etching, can be of minimized width and depth required, consequently assuring the magnetic head of mechanical strength and precluding the adverse effect that would otherwise be exerted on the amount of levitation. In this respect, the present invention has the advantage of reducing the number of steps needed and precluding the impairment of performance due to the chemical reaction of glass.

Although a combined film of photoresist, copper and photoresist in superposed layers is used for masking in the foregoing embodiment, the masking materials are not limited to these examples. The requirements to be fulfilled by the masking materials are as follows.

The material to be used for the first resin film 16 is one which can be subjected to oxygen plasma etching and is soluble in organic solvents. The surface eventually resulting from the removal of this first resin film is an important portion participating in the exchange of data with the recording medium and needs to be free of even the slightest degradation. For this reason, corrosive etchants are not usable for removing the resin film, which must be removed with a non-corrosive organic solvent.

The metal or oxide to be used for the second film 17 needs to fulfill the requirement of being very low in the rate of oxygen plasma etching and causing no damage to the first resin film 16. Accordingly, the material must be formable into the film 17 with low power so as not to overheat the core block with the radiant heat from the source of deposition and needs to be soft and deformable so as not to produce any excessive residual stress in the resin film and to be capable of forming the film 17 at a very high rate so as not to react with the resin film. The materials meeting these requirements are, besides copper, aluminum, silicon dioxide, etc.

The material to be used for the third resin film 18 must be photosensitive, capable of forming a pattern without causing any damage to the first film 16 and fully serviceable as a mask for patterning the underlying second film 17.

Finally, a description will be given of the composition of the thin film 19 of ferromagnetic metal shown in FIG. 2 and the method of forming this film.

The thin film 19 is formed by an Fe-Al-Si-N alloy comprising 4.0 wt. % to 7.0 wt. % of aluminum Al, 8.0 wt. % to 12.0 wt. % of silicon Si, 0.5 wt. % to 5.0 wt. % of nitrogen N and the balance substantially iron Fe.

Although Permalloy (Fe-Ni alloy), Sendust (Fe-Al-Si alloy), etc. are already known as materials for forming the ferromagnetic metal thin film of MIG-type magnetic heads, improvements in the recording-reproduction performance require magnetic materials which are still higher in saturation magnetic flux density and greater in magnetic permeability than these magnetic materials.

Accordingly, we have developed a novel magnetic material which is prepared by incorporating a very small amount of nitrogen into Sendust alloy known for use in forming the ferromagnetic metal thin film 19 of the foregoing embodiment. Further the film is formed by the so-called reactive sputtering process wherein a Sendust thin film is formed in an atmosphere of argon gas and nitrogen gas admixed therewith.

Figure 23:
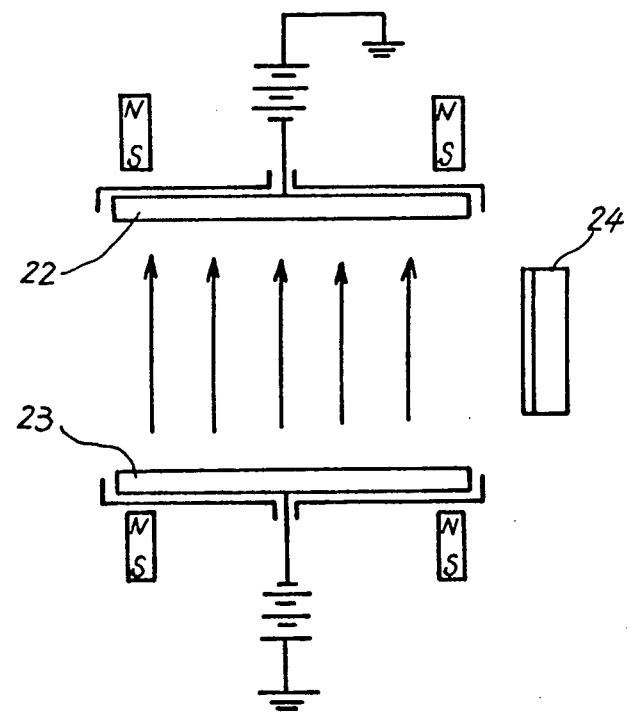
FIG. 23 is a diagram schematically showing the construction of a D.C. opposed target magnetron sputtering apparatus for use in forming a thin film of ferromagnetic metal in the process of the invention.

A D.C. opposed target magnetron sputtering apparatus is chiefly used for sputtering. As schematically shown in FIG. 23, a magnetic field of high intensity is set up in the space between two opposed targets 22 and 23. A high-density plasma region is formed in the space to cause sputtering particles to impinge on the surface of the substrate 24 disposed on one side.

Figure 24:
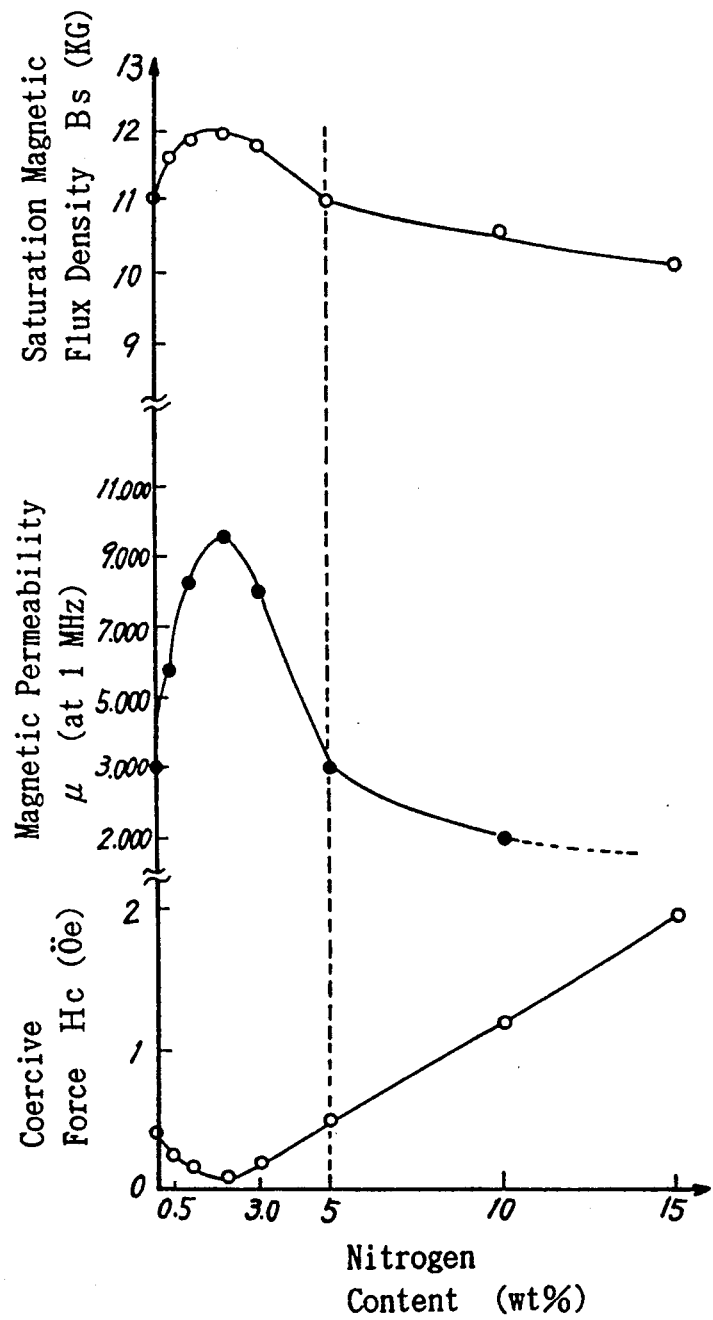
FIG. 24 is a diagram showing the relationship between the magnetic characteristics and the nitrogen content of thin films formed by the apparatus.

Using the apparatus at varying nitrogen gas partial pressures for reactive sputtering, thin films of ferromagnetic metal having different nitrogen contents were prepared. The samples obtained were tested for magnetic characteristics (saturation magnetic flux density Bs, magnetic permeability $\mu$ and coercive force Hc). FIG. 24 shows the results obtained. The samples had the composition previously described except the nitrogen content.

FIG. 24 reveals that the samples with a nitrogen content in the range of 0.5 wt. % to 5.0 wt. % preferably in the range of 0.5 wt. % to 3.0 wt. %, are superior in the magnetic characteristics to the nitrogen-free sample (i.e. conventional Sendust).

Figure 25:
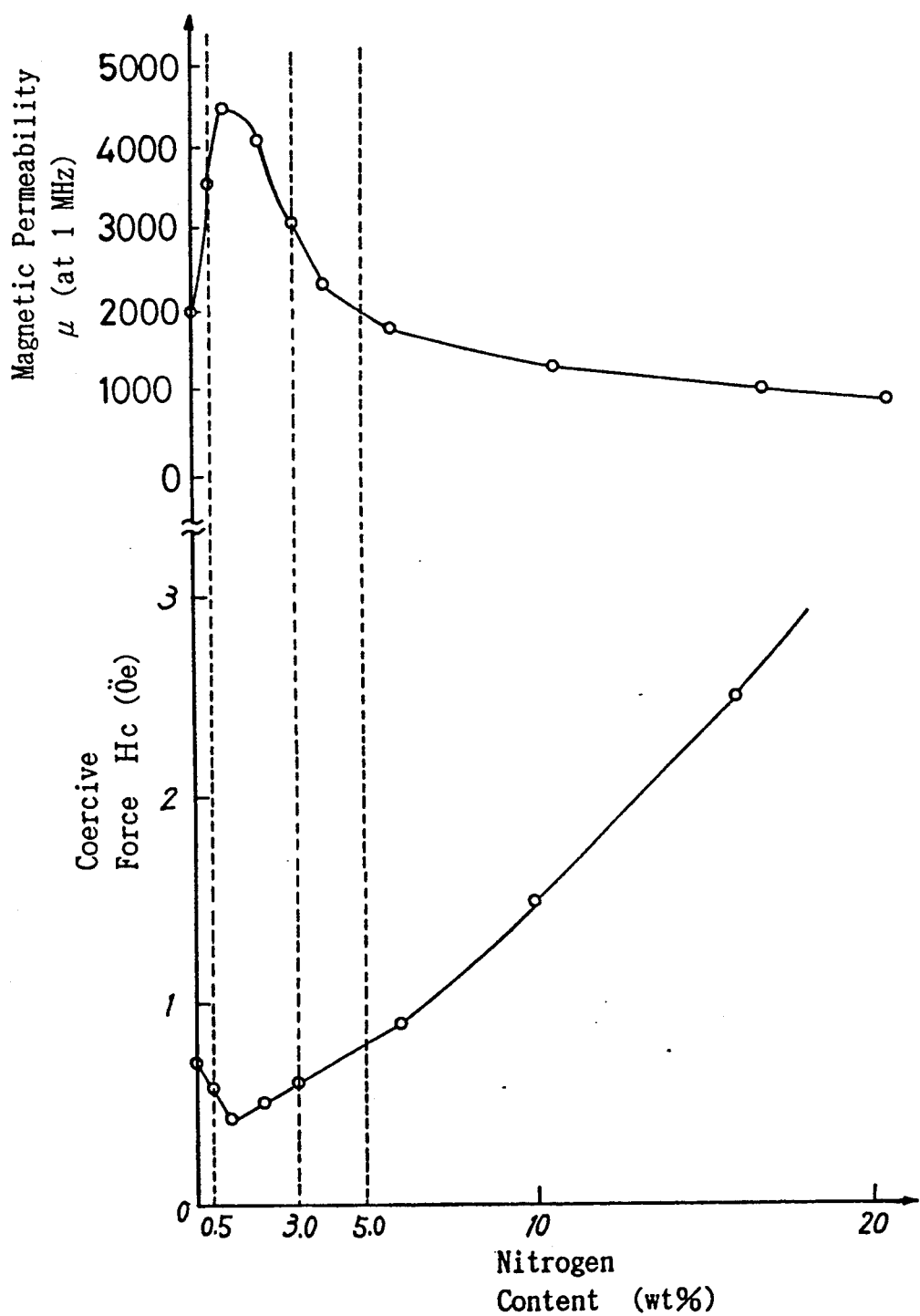
FIG. 25 is a diagram showing the relationship between the magnetic characteristics and the nitrogen content of thin films of ferromagnetic metal formed by an RF 2-electrode magnetron sputtering apparatus.

FIG. 25 shows the relationship between the magnetic characteristics and the nitrogen content established for thin films of ferromangetic metal which were prepared using an RF 2-electrode magnetron sputtering apparatus. Substantially the same result as is shown in FIG. 24 was obtained in respect of saturation magnetic flux density and is therefore not shown. Presence of about 0.5 wt. % to about 5.0 wt. % of nitrogen apparently results in improved magnetic characteristics also in this case. Higher improvements were achieved in magnetic permeability $\mu$ by the thin films prepared by the D.C. opposed target magnetron sputtering apparatus than those prepared by the RF 2-electrode magnetron sputtering apparatus.

The foregoing results indicate that the MIG-type magnetic head exhibits improved recording-reproduction performance when the thin film 19 of ferromagnetic metal shown in FIG. 2 and incorporated therein is prepared from the Fe-Al-Si-N alloy with a nitrogen content of 0.5 wt. % to 5.0 wt. % by reactive sputtering.

Figure 26:
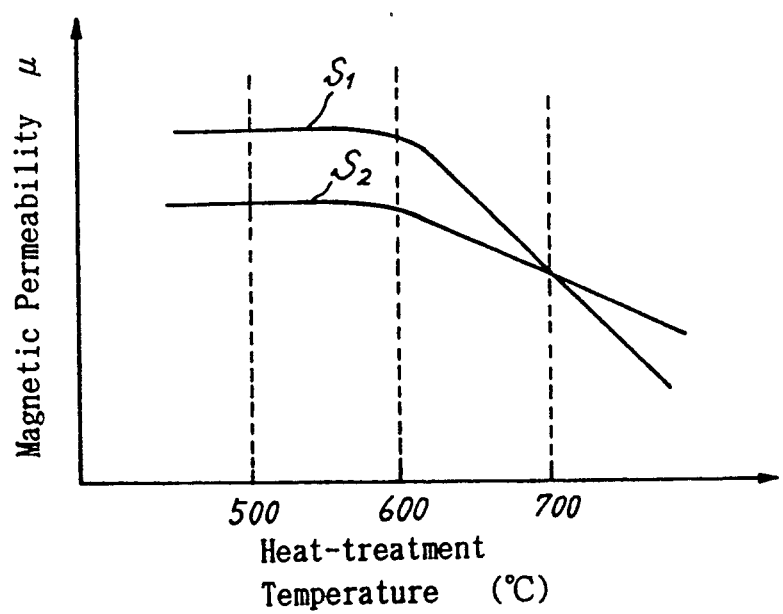
FIG. 26 is a diagram showing the relationship between the heat-treatment temperature and the magnetic permeability.

However, it has been found that the Fe-Al-Si-N alloy becomes greatly impaired in magnetic characteristics, for example, in magnetic permeability, when heat-treated at a temperature exceeding 600° C. as represented by curve $S_1$ in FIG. 26. It is seen that the alloy exhibits lower magnetic permeability than Sendust represented by curve $S_2$ when heat-treated at about 700° C.

Nevertheless, the magnetic head producing process of the present invention is adapted to form the track width defining grooves with minimized width and depth required by dry etching as described above to eliminate the need to fill the grooves with glass. This makes it possible to use a glass melting at a low temperature of 500° C. to 600° C. in the glass bonding step of FIG. 16. Consequently, there is no likelihood of impairing the magnetic characteristics of the thin film 19 of Fe-Al-Si-N alloy, and the magnetic head obtained exhibits more excellent magnetic characteristics than those having a thin film of conventional Sendust.

The embodiment described above is given for the illustration of the present invention and should not be interpreted as restricting the invention as defined in the appended claims or reducing the scope of the invention. Further the steps of the process of the invention are not limited to those of the embodiment but can be modified variously by one skilled in the art without departing from the spirit of the invention.

For example, a very small amount of Cr, Ti or the like can be incorporated into the Fe-Al-Si-N alloy for forming the thin film of ferromagnetic metal to give improved corrosion resistance to the alloy.

Although the above embodiment has been described with reference to the magnetic head of the MIG type wherein thin films of ferromagnetic metal are arranged on opposite sides of a gap spacer, the present invention is of course useful also for magnetic head of the floating type wherein the thin film is disposed on only one side.

What is claimed is:

1. A process for producing a magnetic head of the floating type having a head portion and a slider portion, the process being characterized by the steps of:

preparing a core block having arranged on a plane a head forming portion and a slider forming portion for providing the head portion and the slider portion respectively, the head forming portion comprising a pair of magnetic members opposed to each other with a gap spacer interposed therebetween, and forming at least one pair of track width defining grooves across the gap spacer by dry-etching a surface of the core block which is to be opposed to media and where the gap spacer terminates to form a magnetic gap portion by a portion of the gap spacer of a predetermined track width between the pair of track width defining grooves.

2. A process as defined in claim 1 wherein in the core block preparing step, a thin film of ferromagnetic metal is formed on at least one of the pair of magnetic members over the surface thereof to be opposed to the gap spacer.

3. A process as defined in claim 2 wherein in the core block preparing step, the slider forming portion is formed by the same material as the magnetic members of the head forming portion integrally with one of the magnetic members.

4. A process as defined in claim 3 wherein in the core block preparing step, the thin film of ferromagnetic metal on at least one of the pair of megnetic members is formed by an Fe-Al-Si-N alloy comprising 4.0 wt. % to 7.0 wt. % of aluminum Al, 8.0 wt. % to 12.0 wt. % of silicon Si, 0.5 wt. % to 5.0 wt. % of nitrogen N and the balance substantially iron Fe, and the pair of magnetic members are fixedly joined to each other with glass as a bonding agent at a limited heat-treatment temperature of about 500° C. to about 600° C.

5. A process as defined in claim 1 wherein the grooves are formed to form the magnetic gap portion by successively forming over the surface a first film of a resin soluble in an organic solvent, a second film of a metal or oxide having corrosion resistance to oxygen plasma and a third film of a photosensitive resin, patterning the third film by photoetching in conformity with the pattern of the track width defining grooves, then patterning the second film by sputter etching with the third film serving as a mask, further patterning the first film by plasma etching using oxygen as the main component of an atmosphere gas and the second film as a mask, and thereafter grooving the surface by sputter etching with the first film serving as a mask.

6. A process as defined in claim 5 wherein the first film is a quinonediazide photoresist having a thickness of at least 10 micrometers, the second film is a copper film and the third film is a quinonediazide photoresist.

* * * * *